(12) United States Patent
Wan et al.

(10) Patent No.: US 12,533,957 B2
(45) Date of Patent: Jan. 27, 2026

(54) BATTERY PACK PROTECTION SYSTEM AND VEHICLE

(71) Applicant: BYD COMPANY LIMITED, Shenzhen (CN)

(72) Inventors: Long Wan, Shenzhen (CN); Zhipei Lu, Shenzhen (CN); Qingbo Peng, Shenzhen (CN); Lei Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 268 days.

(21) Appl. No.: 18/310,667

(22) Filed: May 2, 2023

(65) Prior Publication Data

US 2023/0271504 A1    Aug. 31, 2023

Related U.S. Application Data

(63) Continuation of application No. PCT/CN2021/093198, filed on May 12, 2021.

(30) Foreign Application Priority Data

Dec. 23, 2020   (CN) .......................... 202023169035.8

(51) Int. Cl.
*B60L 3/00* (2019.01)
*H01M 50/242* (2021.01)
*H01M 50/249* (2021.01)

(52) U.S. Cl.
CPC ......... *B60L 3/0046* (2013.01); *H01M 50/242* (2021.01); *H01M 50/249* (2021.01); *H01M 2220/20* (2013.01)

(58) Field of Classification Search
CPC .... B60L 3/0046; B60L 50/64; H01M 50/242; H01M 2220/20; H01M 2010/4271;
(Continued)

(56) References Cited

U.S. PATENT DOCUMENTS 9,806,310 B1    10/2017  Pounds
10,355,322 B2 *  7/2019  Takatsuka .............. G01R 31/44
(Continued)

FOREIGN PATENT DOCUMENTS

CN        204323022 U    5/2015
CN        105280859 A    1/2016
(Continued)

OTHER PUBLICATIONS

English translation of Zhan (CN 209472025) (Year: 2025).*
(Continued)

*Primary Examiner* — James J Lee
*Assistant Examiner* — Jonathan E Reinert
(74) *Attorney, Agent, or Firm* — Wenye Tan

(57) ABSTRACT

A battery pack protection system and a vehicle are provided. The battery pack protection system includes a battery pack and a protective plate. The battery pack includes a tray. The tray includes a frame and a bottom plate. Battery modules are arranged on the bottom plate. The protective plate is arranged parallel to the bottom plate, and the protective plate is close to a side of the bottom plate. At least one sensor is arranged on the protective plate. The protective plate is detachably connected to the frame.

11 Claims, 4 Drawing Sheets

(58) Field of Classification Search
CPC . H01M 2200/00; H01M 10/425; Y02E 60/10; B60Y 2200/90; B60Y 2306/01; B60Y 2400/112; Y02T 10/70
See application file for complete search history.

(56) References Cited

U.S. PATENT DOCUMENTS

| | | | |
|---|---|---|---|
| 2018/0123102 A1* | 5/2018 | Lomax | H01M 50/24 |
| 2018/0366792 A1 | 12/2018 | Stachewicz et al. | |
| 2022/0336900 A1* | 10/2022 | Merino | H01M 50/22 |

FOREIGN PATENT DOCUMENTS

| | | |
|---|---|---|
| CN | 105480070 A | 4/2016 |
| CN | 206584967 U | 10/2017 |
| CN | 207818674 U | 9/2018 |
| CN | 208423007 U | 1/2019 |
| CN | 209169232 U | 7/2019 |
| CN | 209351228 U | 9/2019 |
| CN | 209472025 U | 10/2019 |
| DE | 102018130881 A1 | 6/2020 |
| DE | 102019207435 A1 | 11/2020 |
| EP | 3249737 A1 | 11/2017 |
| FR | 3084322 A1 | 1/2020 |
| JP | 2009083599 A | 4/2009 |
| JP | 2017076491 A | 4/2017 |
| KR | 20160069861 A | 6/2016 |

OTHER PUBLICATIONS

English translation of Allgeier (EP_3392070_A1) (Year: 2025).*
The World Intellectual Property Organization (WIPO) International Search Report for PCT/CN2021/093198 Aug. 26, 2021 8 Pages.

* cited by examiner

BATTERY PACK PROTECTION SYSTEM AND VEHICLE

CROSS-REFERENCE TO RELATED APPLICATIONS

The present application is a continuation application of PCT application No. PCT/CN2021/093198 filed on May 12, 2021, which claims priority to Chinese Patent Application No. 202023169035.8, filed on Dec. 23, 2020, and entitled "BATTERY PACK PROTECTION SYSTEM AND VEHICLE", content of all of which is incorporated herein by reference in its entirety.

FIELD

The present disclosure relates to the technical field of new energy vehicles, and more specifically, to a battery pack protection system and a vehicle.

BACKGROUND

At present, new energy vehicles keep increasing rapidly. Power batteries are core assembly components of new energy vehicles, whose safety and reliability are directly related to safety and reliability of the vehicles, and also directly affect safety of vehicle users.

For a new energy vehicle, a power battery pack is generally arranged under a chassis of the vehicle. During traveling, when the vehicle runs over stones or bricks on a road that splash onto or hit the vehicle, goes uphill and pushes against a bottom plate thereof, passes a deceleration belt, collides with a curb, or the like, the bottom of the power battery pack may be damaged by collisions, and serious accidents such as fire or explosion may even occur.

The power battery pack is exposed on the bottom of the vehicle in a large area, and is vulnerable to scratches and impacts during long-term traveling. Moreover, such bumps occur at the bottom of the battery pack, which is difficult to detect and is highly concealed. If such problems cannot be detected in time and effectively controlled, a serious accident of fire or explosion is likely to occur after the battery pack is used for a period of time. How to detect in time and take effective measures to ensure use safety of battery packs is a major technical problem that needs to be solved urgently.

SUMMARY

According to one aspect, an embodiment of the present disclosure provides a battery pack protection system, including: a battery pack, where the battery pack includes a housing and battery modules, the housing includes an upper cover and a tray, the upper cover is suitable for encapsulating the tray, the tray includes a frame and a bottom plate, and the battery modules are arranged on the bottom plate; and a protective plate, where the protective plate is arranged parallel to the bottom plate and close to a side of the bottom plate, and the protective plate is detachably connected to the frame; and at least one sensor, where the sensor is arranged on the protective plate and is configured to detect an impact force on the protective plate when impacted by an external force.

According to another aspect, an embodiment of the present disclosure provides a vehicle, including the foregoing battery pack protection system.

DETAILED DESCRIPTION

To make the technical problems resolved in the present disclosure, the technical solutions, and the beneficial effects clearer and more comprehensible, the following further describes the present disclosure in detail with reference to the accompanying drawings. It should be understood that the specific embodiments described herein are only used to explain the present disclosure and are not intended to limit the present disclosure.

The technical problem to be solved in the present disclosure is to detect impacts on the bottom of a battery pack as early as possible, to maintain or replace the battery pack in time, improving active safety of the battery pack. Based on this, a battery pack protection system and a vehicle are provided.

Figure 1:
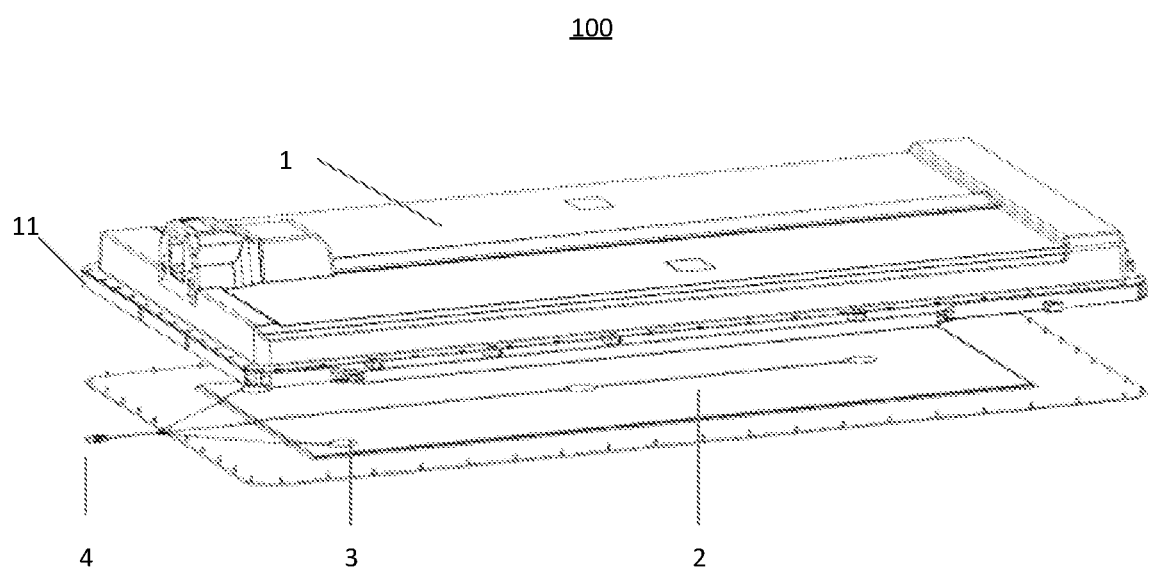
FIG. 1 is a schematic structural diagram of a battery pack protection system according to an embodiment of the present disclosure.
Figure 2:
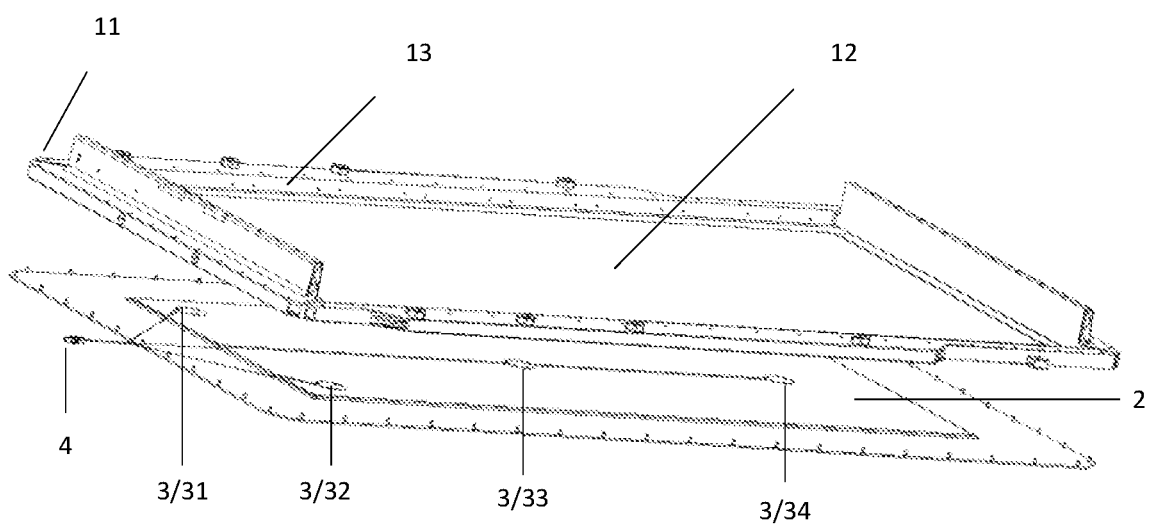
FIG. 2 is a schematic diagram of an internal structure of a battery pack protection system according to an embodiment of the present disclosure.

As shown in FIG. 1 and FIG. 2, a battery pack protection system provided in an embodiment of the present disclosure includes a battery pack 1 and a protective plate 2.

The battery pack 1 includes a housing and battery modules. The housing includes an upper cover and a tray 11. The upper cover is suitable for encapsulating the tray 11. The tray 11 includes a frame 13 and a bottom plate 12. The battery modules are arranged on the bottom plate 12.

The protective plate 2 is arranged parallel to the bottom plate 12, and the protective plate 2 is arranged close to a side of the bottom plate 12. At least one sensor 3 is arranged on the protective plate 2. The protective plate 2 is detachably connected to the frame 13.

The protective plate 2 is arranged close to the bottom plate 12 of the tray 11 of the battery pack, and the sensor 3 is arranged on the protective plate 2. The sensor 3 may be configured to detect an impact force on the protective plate 2 when impacted by an external force. In addition, the sensor 3 may be further configured to detect an impact force on the battery pack when impacted by an external force. For example, the sensor may be configured to sense an external impact of the battery pack on the protective plate.

According to the battery pack protection system of the embodiments of the present disclosure, the protective plate detachably connected to the bottom plate of the battery pack is arranged, which can prevent the battery pack from being directly damaged by collisions on the bottom of the battery pack. Further, the sensor is arranged on the protective plate. An external force such as an impact on the protective plate is sensed through the sensor, and a degree of damage to the protective plate and the battery pack can be learned. In addition, when the protective plate is slightly damaged, the protective plate can be quickly disassembled for detection or maintenance without disassembling or replacing the battery pack, which facilitates detection and maintenance, and reduce maintenance time and costs.

In an embodiment, as can be seen from FIG. 1 and FIG. 2, the protective plate and the battery pack are designed to be separated. The protective plate is separated from the battery pack, and the protective plate can provide primary protection for a bottom damage of the entire protection system. In addition, the protective plate is detachably connected to the bottom plate of the battery pack. When the battery pack protection system is slightly damaged, for example, the battery modules are not damaged and only the protective plate is damaged, only the protective plate needs to be replaced or repaired.

In an embodiment, a specific structure of the tray 11 is shown in FIG. 2, and the tray 11 further includes the frame 13. The tray 11 may be designed integrally with the frame 13 and the bottom plate 12, for example, the frame 13 and the bottom plate 12 are welded. Both the frame 13 and the bottom plate 12 may be formed by extruding aluminum profiles, and the bottom plate 12 may alternatively be made of an aluminum plate.

Figure 3:
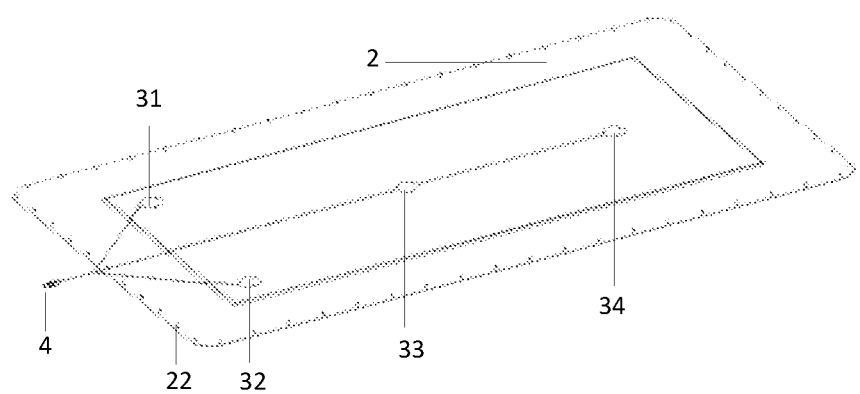
FIG. 3 is a schematic structural diagram of assembly of a protective plate and a sensor in a battery pack protection system according to an embodiment of the present disclosure.

In an embodiment, the bottom plate 12 and the frame 13 are integrally formed, and the protective plate 2 and the frame 13 are connected by bolts 22. The bolts 22 marked in FIG. 3 are used to fix the bottom plate 12, and through holes corresponding to the bolts 22 may be provided on the protective plate 2.

The battery pack protection system of the present disclosure is an active safety protection design, which can perform early detection, early monitoring, early diagnosis, and early maintenance of a bottom damage of the battery pack, and can determine whether the bottom of the battery pack is damaged as soon as possible, to reduce occurrence of safety accidents caused by continued use of the battery pack after damage, improve the active safety of the battery pack, and ensure use safety of personnel and the vehicle. In addition, the design of the protective plate can prevent the battery pack from being directly damaged by external collisions. Corresponding measures can be taken to repair, maintain, or replace the battery pack according to a degree of damage to the battery pack detected by the sensor.

Figure 4:
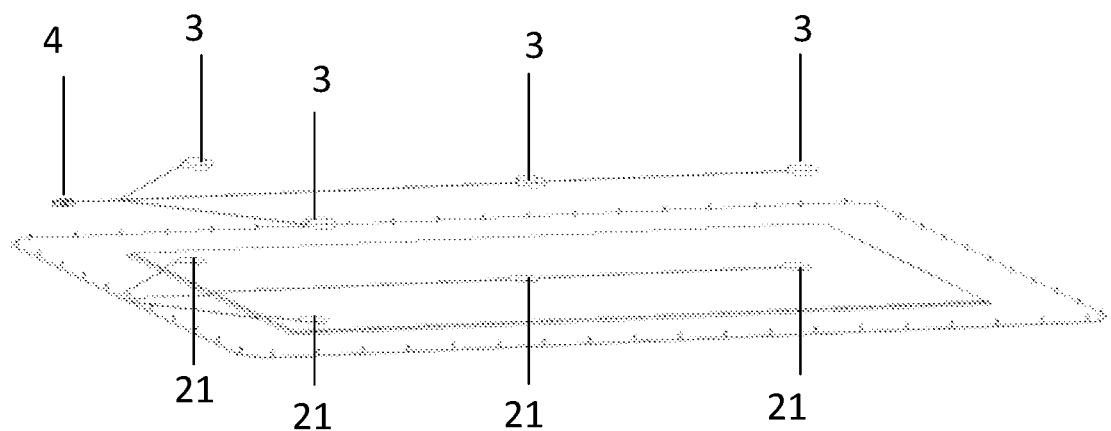
FIG. 4 is a schematic diagram of assembly of a protective plate and a sensor in a battery pack protection system according to an embodiment of the present disclosure.

In an embodiment, an assembly structure of the protective plate 2 and the sensor 3 is shown in FIG. 4. A groove hole 21 is provided on a side of the protective plate 2 close to the tray 11, and the sensor 3 is mounted in the groove hole 21. The groove hole 21 on the protective plate 2 is assembled with the sensor 3, and the groove hole 21 and the sensor 3 are designed in one-to-one correspondence.

A quantity of sensors 3 on the protective plate 2 in the embodiments of the present disclosure may be multiple, or may be one or two. In actual application, the quantity and arrangement orientation of the sensors 3 may be set according to actual requirements. For example, on the protective plate 2 shown in FIG. 1 to FIG. 4, multiple sensors 3 are arranged, and the multiple sensors 3 are distributed on the protective plate 2 in a scattered manner. The multiple sensors 3 may alternatively be distributed in an area more vulnerable to damage in a concentrated manner.

In an embodiment of the present disclosure, the quantity of sensors 3 may be one. The battery modules are all placed on the bottom plate 12, and the bottom plate 12 can sense mechanical forces such as impacts and expansion of the battery modules. Further, the bottom plate 12 is connected to the protective plate 2. A force transmitted by any battery module from the inside of the battery pack can be further transmitted to the protective plate 2 through the bottom plate 12, and then detected and sensed by the sensor 3. In addition, when the protective plate 2 is subjected to an external mechanical force, the force may alternatively be transmitted to a position where the sensor 3 is mounted through the protective plate 2, to detect that the protective plate 2 is impacted or damaged. In this way, the quantity of sensors 3 may be designed according to requirements, without the need to provide one-to-one corresponding sensors 3 for each battery module, thereby saving components and reducing protection costs of the battery pack.

An arrangement position of the sensor 3 is not limited in the present disclosure, and may be set according to actual requirements. For example, the sensor may be arranged at a portion where collisions are more likely to occur. For example, when the battery pack protection system is mounted on a vehicle, the sensor may be mounted in a direction of the protective plate close to a front of the vehicle (a position where it is easier to come into contact with a collision object when the vehicle moves forward), or a small amount of sensors may be arranged on the protective plate close to a rear of the vehicle or close to a side surface of the vehicle. Generally, when the vehicle moves forward, the protective plate close to the front of the vehicle is more likely to be subjected to a mechanical external force first. In this case, it is preferable to arrange the sensors in the direction close to the front of the vehicle. When the vehicle turns, two sides of the protective plate (namely, two sides in a width direction of the vehicle) are more likely to be subjected to a mechanical external force first. In this case, it is also preferable to arrange the sensors on the two sides of the protective plate close to the width direction of the vehicle. In summary, optionally, the sensors may be respectively arranged on left and right sides of the protective plate close to the front of the vehicle. Certainly, the sensors may alternatively be arranged in the middle or rear of the protective plate.

In an embodiment of the present disclosure, the sensors 3 are arranged on the same side of the protective plate 2. For example, two sensors are arranged on the protective plate, and the two sensors are both distributed in the direction close to the front of the vehicle.

According to after-sales big data analysis of damage at the bottom of the battery pack, it is found that most of bump damage at the bottom of the battery pack is concentrated in the front half of the bottom of the battery pack, accounting for more than 85% of the damage. In an embodiment, active safety detection and protection for the front half of the bottom of the battery pack should be the top priority, and other positions should be secondary protection areas. Therefore, collision sensors for the protection of the bottom of the battery pack are mainly arranged in the front half with proper position layout and quantity, which is simple and effective, and has low costs.

In an embodiment of the present disclosure, when the battery pack protection system is mounted on a vehicle, the battery pack protection system further includes a connector and a vehicle control unit (not shown in the figure). The connector 4 is configured to connect the vehicle control unit and the sensor. The vehicle control unit is configured to control operation or maintenance of a vehicle in which the battery pack is located according to information detected by the sensor.

The connector may be communicatively connected to the sensor through a signal transmission line, to implement information transmission of the sensor.

When the sensor detects mechanical damage to the battery pack or the protective plate, information may be transmitted to the vehicle control unit, to control a vehicle running state based on the information transmitted by the sensor, effectively identify the damage to the battery pack or the protective plate, and perform processing such as repair and maintenance when damage is determined.

In an embodiment of the present disclosure, the vehicle control unit may perform different processing according to different information received. For example, the vehicle control unit is configured to control the vehicle to travel normally when receiving first detection information transmitted by the sensor. For another example, the vehicle control unit is further configured to prompt, when receiving second detection information transmitted by the sensor, a driver and a passenger of the vehicle to repair and maintain the protective plate and/or the battery pack within a preset time or within a preset vehicle travel distance. For still another example, the vehicle control unit is further configured to prompt, when receiving third detection information transmitted by the sensor, the driver and the passenger of the vehicle to stop immediately, and to repair, maintain, or replace the protective plate and/or the battery pack.

In an embodiment of the present disclosure, the sensor may be formed by connecting several resistance strain gauges in series or in parallel. The first detection information is that a voltage value detected by the sensor is less than or equal to a preset safety threshold. The second detection information is that the voltage value detected by the sensor is greater than the preset safety threshold and less than or equal to a preset danger threshold. The preset safety threshold is less than the preset danger threshold. The third detection information is that the voltage value detected by the sensor is greater than the preset danger threshold.

The vehicle control unit may set determination logic to determine whether the battery pack functions normally or a degree of damage to the battery pack according to the received detection information, and control traveling of the vehicle or control repair and maintenance of the protective plate or the battery pack according to a determination result. For example, when the voltage value detected by the sensor is less than or equal to the preset safety threshold, it is considered that the bottom of the battery pack or the protective plate is subjected to a mechanical force such as a slight collision, the battery pack functions normally, and the vehicle can travel normally without repair or maintenance. When the voltage value detected by the sensor is greater than the preset safety threshold and less than or equal to the preset danger threshold, it is considered that the bottom of the battery pack is subjected to a mechanical force such as a moderate collision, a collision acceleration is large, and the bottom of the battery pack is damaged to a certain extent. Failure to repair in time may cause safety risks. In this case, the vehicle control system issues a warning to remind the driver and the passenger of the vehicle that the battery pack or the protective plate is damaged, there is a safety risk, and timely repair or maintenance should be performed. The protective plate and/or the battery pack may be inspected and maintained within the preset time or within the preset vehicle travel distance. When the voltage detected by the sensor is greater than the danger threshold, it is considered that the bottom of the battery pack is seriously damaged and there is a serious safety risk. The vehicle control unit sends a danger signal to remind the driver and the passenger of the vehicle to stop immediately and contact professional maintenance personnel to repair, maintain, or replace the protective plate and/or the battery pack, to ensure safety of the vehicle, the driver, and the passenger.

The sensor is formed by connecting several resistance strain gauges in series or in parallel. In this way, deformation caused by a strain resistor of the sensor can change a resistance value, and the change of the resistance value is converted into a change of an output voltage through the sensor, to detect the strength of the collision. The degree of damage to the bottom of the battery pack is further determined based on the output voltage.

In an embodiment of the present disclosure, the sensor may further transmit information to the vehicle control unit through the connector by sensing other information than the output voltage. This is not limited in the present disclosure.

In an embodiment of the present disclosure, a detector may be further arranged on the frame, and the detector is configured to detect an internal force between battery cells or the battery modules inside the battery pack. For example, at least one sensor is arranged on the frame. The sensor is used to sense a force such as internal expansion of the battery pack. The internal force is detected by the sensor on the frame, and the detected internal force is transmitted to the vehicle control unit. Information detected by the sensor on the frame and information detected by the sensor on the protective plate may alternatively be transmitted to the vehicle control unit together as a basis for determining whether the battery pack is damaged and whether the battery pack needs repair, maintenance, or replacement.

An embodiment of the present disclosure provides a vehicle, including the foregoing battery pack protection system in FIG. 1 to FIG. 4.

In an embodiment, the sensors are arranged in a direction close to a front of the vehicle.

In an embodiment, with reference to FIG. 1 to FIG. 4, the sensors 3 include a first sensor 31, a second sensor 32, a third sensor 33, and a fourth sensor 34. The first sensor 31 and the second sensor 32 are arranged on two sides of the protective plate close to a front of the vehicle. The third sensor 33 is arranged at a middle position of the protective plate. The fourth sensor 34 is arranged on the protective plate close to a rear of the vehicle.

According to the vehicle of the embodiments of the present disclosure, the vehicle includes the battery pack protection system, which can better monitor external forces such as vehicle collisions, and quickly detect a degree of damage to the battery system. The sensors may be arranged properly at positions vulnerable to impacts. Compared with an arrangement manner of a one-to-one correspondence between the battery modules and the sensors, a quantity of sensors can be reduced and the protection costs of the battery pack can be reduced.

The foregoing descriptions of the battery pack protection system in FIG. 1 to FIG. 4 are also applicable to the battery pack protection system in the vehicle, and are not repeated herein to avoid repetition.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A battery pack protection system, comprising:
    a battery pack, wherein the battery pack comprises a housing and battery modules, the housing comprises an upper cover and a tray, the upper cover is suitable for encapsulating the tray, the tray comprises a frame and a bottom plate, and the battery modules are arranged on the bottom plate;
    a protective plate, wherein the protective plate is arranged parallel to the bottom plate and next to a side of the bottom plate, and the protective plate is detachably connected to the frame; and a plurality of sensors, wherein at least one of the plurality of sensors is arranged on the protective plate and is configured to detect an impact force on the protective plate when impacted by an external force, wherein a plurality of groove holes are provided on a side of the protective plate next to the tray, and each of the groove holes individually hosts one of the plurality of sensors.

2. The battery pack protection system according to claim 1, wherein the bottom plate and the frame are integrally formed, and the protective plate and the frame are connected by bolts or rivets.

3. The battery pack protection system according to claim 1, wherein the plurality of sensors are distributed on the protective plate in a scattered manner; the plurality of sensors are distributed in a predetermined pattern; and the plurality of groove holes are distributed in the same predetermined pattern.

4. The battery pack protection system according to claim 1, wherein the sensors are arranged on a same side of the protective plate.

5. The battery pack protection system according to claim 1, further comprising:

a vehicle control unit, wherein the vehicle control unit is connected to the plurality of sensors, and the vehicle control unit is configured to control operation or maintenance of a vehicle in which the battery pack is located according to information detected by the sensors.

6. The battery pack protection system according to claim 5, wherein the vehicle control unit is configured to control the vehicle to travel normally when receiving first detection information transmitted by the sensors;

the vehicle control unit is further configured to prompt, when receiving second detection information transmitted by the sensors, a driver and a passenger of the vehicle to repair and maintain the protective plate and/or the battery pack within a preset time or within a preset vehicle travel distance; and the vehicle control unit is further configured to prompt, when receiving third detection information transmitted by the sensors, the driver and the passenger of the vehicle to stop immediately, and to repair, maintain, or replace the protective plate and/or the battery pack.

7. The battery pack protection system according to claim 6, wherein the sensor is formed by connecting several resistance strain gauges in series or in parallel, wherein the first detection information is that a voltage value detected by the sensor is less than or equal to a preset safety threshold;

the second detection information is that the voltage value detected by the sensor is greater than the preset safety threshold and less than or equal to a preset danger threshold, and the preset safety threshold is less than the preset danger threshold; and the third detection information is that the voltage value detected by the sensor is greater than the preset danger threshold.

8. The battery pack protection system according to claim 1, wherein at least one of the plurality of sensors is arranged on the frame, and the at least one sensor arranged on the frame is configured to detect an internal force between battery cells or the battery modules inside the battery pack.

9. A vehicle, comprising the battery pack protection system according to claim 1.

10. The vehicle according to claim 9, wherein the sensors are arranged in a direction towards a front of the vehicle.

11. The vehicle according to claim 9, wherein the sensors comprise a first sensor, a second sensor, a third sensor, and a fourth sensor, the first sensor and the second sensor are arranged on two sides of the protective plate towards a front of the vehicle, the third sensor is arranged at a middle position of the protective plate, and the fourth sensor is arranged on the protective plate towards a rear of the vehicle.

\* \* \* \* \*